US010888784B2

(12) United States Patent
Guimaraes et al.

(10) Patent No.: US 10,888,784 B2
(45) Date of Patent: Jan. 12, 2021

(54) CONTROL OF PLAYER CHARACTER WITH ENHANCED MOTION FUNCTIONALITY (71) Applicant: SQUARE ENIX LIMITED, London (GB)

(72) Inventors: Rangner Ferraz Guimaraes, Verdun (CA); Rodrigo Barros Lima, Verdun (CA)

(73) Assignee: SQUARE ENIX LIMITED, London (GB)

( * ) Notice: Subject to any disclaimer, the term of this patent is extended or adjusted under 35 U.S.C. 154(b) by 0 days.

(21) Appl. No.: 16/528,447

(22) Filed: Jul. 31, 2019

(65) Prior Publication Data
US 2020/0376383 A1 Dec. 3, 2020

(30) Foreign Application Priority Data

May 28, 2019 (CA) ...................................... 3044587

(51) Int. Cl.
*A63F 13/00* (2014.01)
*A63F 13/573* (2014.01)
*A63F 13/46* (2014.01)
*G06T 13/40* (2011.01)

(52) U.S. Cl.
CPC ............ *A63F 13/573* (2014.09); *A63F 13/46* (2014.09); *G06T 13/40* (2013.01)

(58) Field of Classification Search
CPC ........ A63F 13/573; A63F 13/42; A63F 13/06; A63F 13/57; A63F 2300/42; A63F 2300/305

See application file for complete search history.

(56) References Cited

U.S. PATENT DOCUMENTS

2010/0261526 A1* 10/2010 Anderson ............... G06F 3/017
463/31
2017/0242504 A1* 8/2017 Hanson ................. G06F 3/0393

FOREIGN PATENT DOCUMENTS

JP 2000153062 A 6/2000
JP 2017035214 A 2/2017
JP 2018110659 A 7/2018

OTHER PUBLICATIONS

Angry Birds (Year: 2009).*

(Continued)

*Primary Examiner* — Omkar A Deodhar
*Assistant Examiner* — Eric M Thomas
(74) *Attorney, Agent, or Firm* — Fenwick & West LLP (57) ABSTRACT A video game apparatus, comprising at least one processor and a non-transitory storage medium operably connected to the at least one processor and storing computer-readable program instructions. The at least one processor is configured to execute the program instructions, wherein execution of the program instructions by the at least one processor causes carrying out of a method. The method comprises maintaining a virtual environment in the memory, the virtual environment including a player character; receiving a request for enhanced motion functionality of the player character; identifying a landing site in the virtual environment based on one or more validity criteria; determining a trajectory to the identified landing site; and causing the player character to exhibit enhanced motion functionality by traveling at least partly along said trajectory.

30 Claims, 8 Drawing Sheets (56) References Cited

OTHER PUBLICATIONS

Marvel's Spider-Man (Year: 2018).*
Grand Theft Auto V (Year: 2013).*
The Japan Patent Office, Office Action, Japanese Patent Application No. 2019-139417, dated Sep. 10, 2020, 11 pages.

* cited by examiner

| Landing Site Identifier | Attribute #1 | Attribute #2 | ... | Attribute #N |
|---|---|---|---|---|
| LS-1 | | | | |
| LS-2 | | | | |
| LS-3 | | | | |
| ... | ... | ... | ... | ... |
| LS-N | | | | |

| 800 | | |
|---|---|---|
| Game object ID | Properties | Position |
|  |  |  |
|  |  |  |
|  |  |  |
|  |  |  |

Fig. 8

CONTROL OF PLAYER CHARACTER WITH ENHANCED MOTION FUNCTIONALITY

FIELD

The present invention relates generally to video games and, in particular, to controlling travel of a player character in a video game.

BACKGROUND

In a video game, a player character navigates a 3D virtual environment by traveling along various travel surfaces. Some of these travel surfaces are separated by gaps in the 3D virtual environment, such gaps having to be avoided by the player character so as to keep advancing in the video game. The objective is, therefore, to control the player character so as to jump across a gap and make it to the other side. In some cases, the gap may be wider than what can be crossed by the player character executing physically plausible moves. In such cases, the player character needs to be capable of "enhanced motion functionality" to make it to the other side of the gap.

SUMMARY

According to a first broad aspect, there is provided a video game apparatus, comprising: at least one processor; and a non-transitory storage medium operably connected to the at least one processor and storing computer-readable program instructions; the at least one processor being configured to execute the program instructions, wherein execution of the program instructions by the at least one processor causes carrying out of a method that comprises: maintaining a virtual environment in the memory, the virtual environment including a player character; receiving a request for enhanced motion functionality of the player character; identifying a landing site in the virtual environment based on one or more validity criteria; determining a trajectory to the identified landing site; and causing the player character to exhibit enhanced motion functionality by traveling at least partly along said trajectory.

According to a second broad aspect, there is provided a computer-implemented video game method, comprising: maintaining a virtual environment in the memory, the virtual environment including a player character; receiving a request for enhanced motion functionality of the player character; identifying a landing site in the virtual environment based on one or more validity criteria; determining a trajectory to the identified landing site; and causing the player character to exhibit enhanced motion functionality by traveling at least partly along said trajectory.

According to a third broad aspect, there is provided a non-transitory computer-readable storage medium storing computer-readable instructions which, when executed by a processor, cause the processor to carry out a method that comprises: maintaining a virtual environment in the memory, the virtual environment including a player character; receiving a request for enhanced motion functionality of the player character; identifying a landing site in the virtual environment based on one or more validity criteria; determining a trajectory to the identified landing site; and causing the player character to exhibit enhanced motion functionality by traveling at least partly along said trajectory.

According to a fourth broad aspect, there is provided a video game apparatus, comprising: at least one processor; and a non-transitory storage medium operably connected to the at least one processor and storing computer-readable program instructions; the at least one processor being configured to execute the program instructions, wherein execution of the program instructions by the at least one processor causes carrying out of a method that comprises: maintaining a virtual environment in the memory, the virtual environment including a player character; detecting that the player character has entered an enhanced functionality zone of the virtual world, the enhanced functionality zone being associated with one or more landing sites; identifying one of the one or more landing sites in the enhanced functionality zone based on at least one of an orientation and a position of the player character; and causing the player character to travel towards the identified landing site in response to receipt of a request for enhanced motion functionality of the player character.

BRIEF DESCRIPTION OF THE DRAWINGS

These and other aspects will be best understood with reference to the following description in conjunction with the drawings, in which.

The drawings are illustrative of example embodiments and are not intended to be limiting.

DETAILED DESCRIPTION

Figure 1:
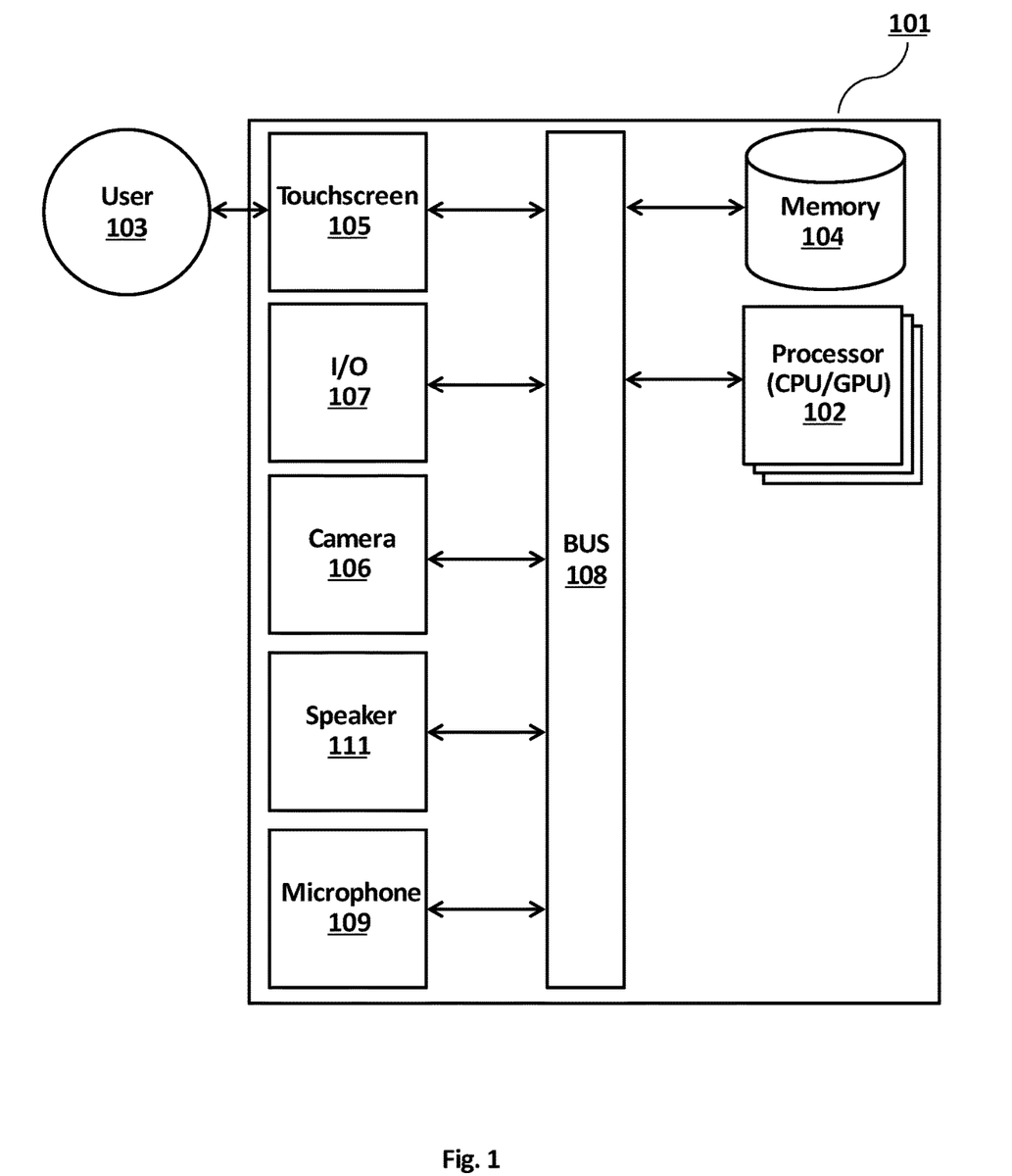
FIG. 1 is a block diagram of a game device, in accordance with a non-limiting embodiment.

Reference is made to FIG. 1, which illustrates a gaming device 101 (such as a game console, tablet or smartphone, for example) executing a video game. The gaming device 101 includes a non-transitory storage medium (memory 104) operably connected to at least one processor 102 and storing computer-readable program instructions. The video game is, in essence, an interactive computer program defined by the computer-readable instructions stored in the memory 104 and read and executed by the at least one processor 102.

The at least one processor 102 can include one or more central processing units (CPUs) and/or one or more graphics processing units (GPUs). A bus 108 may allow communication between the at least one processor 102 and the memory 104. A screen 105 and a loudspeaker 111 may be connected to the at least one processor 102 via an input/output interface (I/O) 107 and the bus 108. A user 103 provides user inputs via at least one input device (including one or more of a joystick, touchscreen (e.g., screen 105), keyboard, controller, microphone 109, camera 106 and/or gesture sensor, for example). The at least one input device may be connected to the at least one processor 102 via the I/O 107 and the bus 108.

In a simple non-limiting example embodiment, the interactive computer program defined by the computer-readable instructions includes a game loop (sometimes referred to as "game logic") and a rendering process, both of which are run by the at least one processor 102. The rendering process may be asynchronous (especially if executed by one or more graphics processing units—GPUs) relative to the game loop.

As part of executing the game loop, the inputs received from the user 103 are processed, which results in changes to data regarding a 3D virtual environment stored and maintained in the memory 104. When this changed data is processed by the game loop and the rendering process, this results in changes to the images being rendered on the screen 105 and new sounds being produced by the loudspeaker 111. These outputs provoke the user 103 into responding by making further inputs via the at least one input device, and so on.

The final output of the rendering process is a framebuffer (array of pixels) that is displayed on the screen 105 at a regular frame rate (24 fps, 30 fps, 60 fps) to create final output images. In some embodiments, there may be a plurality of framebuffers used to compose the final output images. Sound is typically managed by the game loop on the main thread (on the CPU) with other pieces of hardware dealing with input and output (i.e., DAC—digital to audio conversion) and is output via the loudspeaker 111. The images and sounds produced are related to various "game objects" whose properties and positions stored in the memory 104. Examples of game objects include player characters (PCs) and non-player characters (NPCs), as well as buildings, walls, vehicles, weapons, trees, equipment, travel surfaces and any other conceivable type of object that may be part of a game scenario. Some of the game objects are elements in the 3D virtual environment with which player characters and non-player characters may interact.

Figure 8:
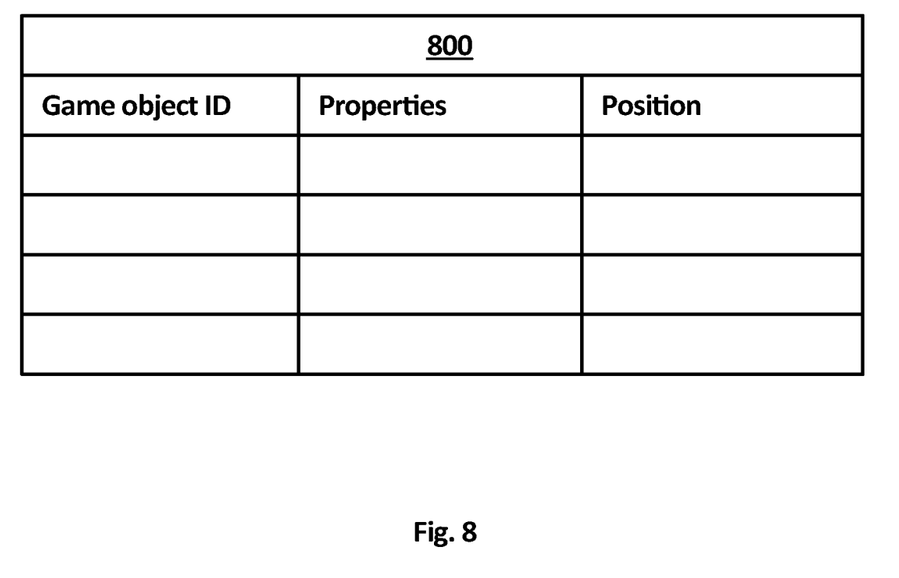
FIG. 8 shows a possible data structure for storing game objects, their associated properties and positions.

Each of the game objects may be characterized by a set of properties and a position in a 3D virtual environment, maintained in the memory 104. FIG. 8 shows a table 800 that conceptually illustrates storage of the properties and positions of a plurality of game objects, which could include player characters and travel surfaces, to name a few non-limiting possibilities. In particular, the table 800 provides a series of records, one for each game object. Of course, other data structures are possible. The position of a game object may be encoded as a set of vertices or coordinates occupied by the game object in the 3D virtual environment. For example, the position of a game object may be the result of a world-space transformation on an absolute position. The set of properties for a game object may include a description of the game object, in addition to possibly an orientation or surface normal and numerous other properties such as name, type of character, lives, power, weapons, etc.

Figure 2:
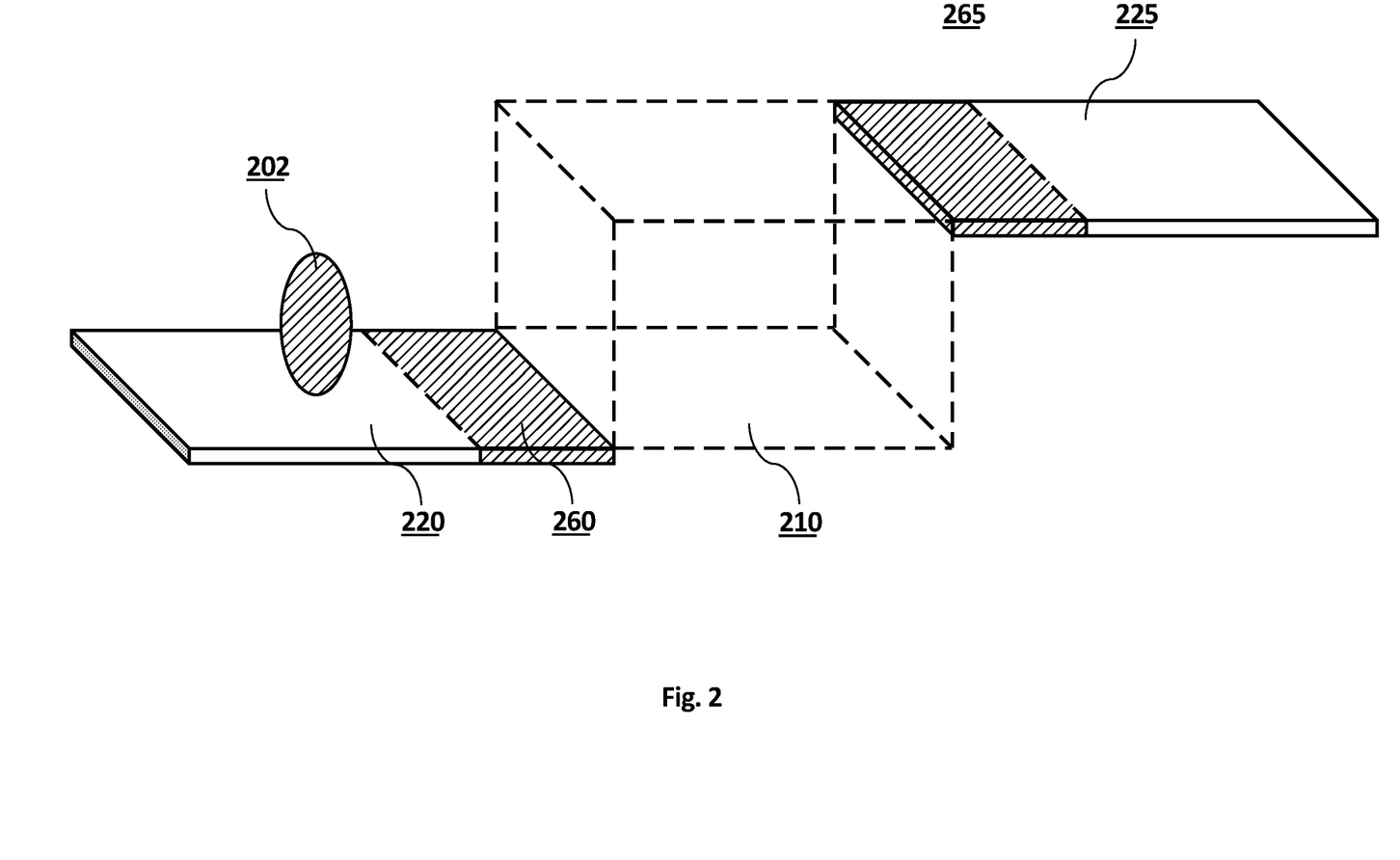
FIG. 2 depicts a scene in a video game, including a player character and a gap to be crossed by the player character, in accordance with a non-limiting embodiment.

With additional reference to FIG. 2, there is shown a non-limiting example of a scene comprising a player character 202 and other game objects from the 3D virtual environment. The scene may be rendered on the screen 105 and shows a portion of the 3D virtual environment from the perspective of a virtual camera in the 3D virtual environment. In particular, there is shown a pair of travel surfaces 220, 225. The travel surfaces 220, 225 may be game objects in the 3D virtual environment whose positions and properties are stored in the memory 104 (such as in the table 800).

Also shown in FIG. 2 is a gap 210 (which may be measured between game objects 220, 225 and may even be a game object in and of itself) between edges of the travel surfaces 220, 225. In other embodiments, a single gap may separate more than two travel surfaces. Generally speaking, a gap separating two travel surfaces may provide a horizontal and/or vertical separation between these travel surfaces. That is to say, the gap has an overall size that has either a non-zero vertical component or a non-zero horizontal component or both. As such, the travel surfaces 220, 225 on either side of the gap 210 need not be at the same altitude in the 3D virtual environment.

The gap 210 may have a size greater than what could be crossed by the player character 202 executing realistic-appearing moves (e.g., walking or conventional jumping under the effects of gravity) and thus the player character 202 is required to be capable of enhanced motion functionality (e.g., "Jet Boots") in order to cross the gap 210. In some cases, enhanced motion functionality provides an anti-gravity effect (gravity-defying behavior) and/or abnormally high acceleration at lift-off.

According to certain embodiments, there may be a "landing site" on each of the travel surfaces 220, 225 adjacent the gap 210. Specifically, travel surface 220 comprises a landing site 260, and travel surface 225 comprises a landing site 265. Each of the landing sites 260, 265 is associated with a range of positions that the player character 202 may be able to attain upon completion of a flight across the gap 210 using enhanced motion functionality. As such, each of the landing sites 260, 265 may be associated with vertices in the 3D virtual environment and/or with an anchor point together with a surface normal and dimensions in the direction of and perpendicular to the normal. The landing sites 260, 265 may be game objects whose properties and positions (e.g., as defined by vertices and/or anchor points) may be stored in the table 800. Alternatively, the landing sites 260, 265 may themselves be properties of the travel surfaces 210, 225.

There may be various types of landing sites. Two examples are a "grabbable ledge" and a "landing volume". Other types of landing sites may exist alternatively or in addition thereto. Where a surface adjacent a gap is configured as a ledge, it may be beneficial from a computing efficiency point of view for the game designer to encode this surface as a grabbable ledge, and to encode other configurations of surfaces as landing volumes. Such an encoding could improve computation times on runtime based on pre-determined conditions of a landing site configuration. Also, in the case of a gap where there is no ground present underneath, an extra "landing volume" could nevertheless be created underneath this gap.

The two aforementioned example types of landing sites (grabbable ledge and landing volume) have different characteristics that may make them somewhat different in terms of attainability from across either side of the gap 210. For example, landing site 260 is an example of a landing volume and landing site 265 is an example of a grabbable ledge. In this case, landing site 260, which is a "landing volume", has a relatively large surface area so as to account for slight changes in direction to the player character 202 as it flies across the gap 210 and is steered by the user 103. For its part, landing site 265 is not a landing volume but rather a grabbable ledge. The configuration of a grabbable ledge may be less planar and more linear than that of a landing volume. This may create additional landing possibilities. For example, by landing on a grabbable ledge, the player character 202 can finish its trajectory either in a hang position on the ledge (which could require extra input from the player to make the character pull itself up over the ledge) or on the ground behind the grabbable ledge (similar to the landing volume). The nature of the landing that will be associated with a grabbable ledge may be decided algorithmically (according to pre-specified parameters); alternatively, the game designer may decide to enforce a certain type of landing for a grabbable ledge.

In summary, it will be appreciated that during the level design of the game, the landing sites separated by a gap may be coded as having the property of a grabbable ledge or a landing volume. Each type of landing site has a different outcome on the way that the game is played, as it defines where and/or how a player character can land after having activated enhanced motion functionality.

Attributes of each of the landing sites, such as the vertices that define its size and position, as well as its type (e.g., "grabbable ledge" or "landing volume"), can be stored in the memory 104. For example, they can be stored as records of the table 800; this notion is illustrated in greater detail in FIG. 3, which shows a database 310 of landing sites. The contents of the database 310 are represented as a table for purposes of convenience and not as a limitation. The table includes a plurality of rows 320, each row corresponding to a different landing site in the virtual environment. The columns 330 represent different attributes of the corresponding landing site. As such, each entry in the table corresponds to a particular attribute for a particular landing site. Examples of attributes have already been described, and can include position in the 3D virtual environment, size/dimensions and type (e.g., grabbable ledge or landing volume). Other attributes of the landing sites may also be stored in the database 310.

Figure 3:
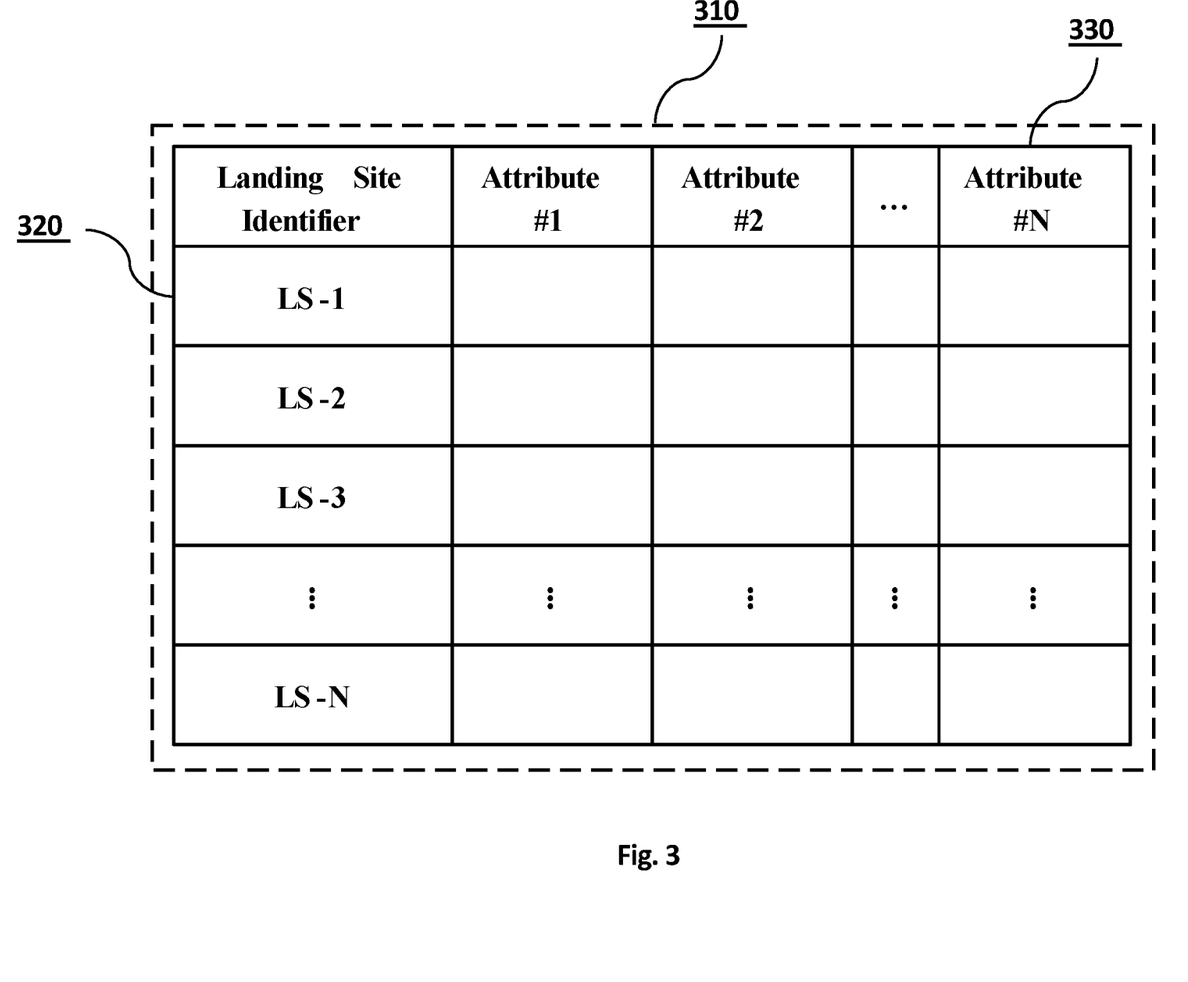
FIG. 3 shows a possible structure of a database describing landing sites, in accordance with a non-limiting embodiment.

For example, one or more of the landing volumes may be associated with an axis (referred to as an "allowed axis") over which the player character 202 will be allowed to land. In a non-limiting example of world-space coordinates where the ground plane is the X-Y plane and Z is defined as the up axis, an example of an allowed axis for a particular landing volume may be the X-axis or the Y-axis. The allowed axis can be stored in the database 310 as an attribute of the particular landing volume. If by default the X and Y axes cross at the center of the particular landing volume, the allowed axis can be shifted by an offset so as to shift the positions where the player character 202 is allowed to land, post-flight, on the landing volume (i.e., he axis along which the player character 202 contacts the landing volume when landing). The offset parameter can be selected at the time of game design by the level designer and stored in the database 310 as an attribute of the particular landing volume.

To take another example, it may be desirable for a landing site that is a grabbable ledge be considered as a valid destination when the player character 202 is coming from a lower altitude (i.e., jumping up), but not from a higher altitude (jumping down). As such, a flag may be associated with the landing volume that allows the landing volume to be considered when the player character 202 is jumping up, and to be removed from consideration in the opposite scenario. This flag is therefore indicative of conditional validity of the landing volume as a possible landing site for the player character 202. It can be set at the time of game design by the level designer and stored in the database 310 as an attribute of the landing volume.

Of all the landing sites in the 3D virtual environment, most (if not all) may be unattainable by the player character 202 from its current position if the user 103 were to request enhanced motion functionality. As the player character 202 moves in the 3D virtual environment, one of the nearby landing sites may eventually meet certain "validity criteria" such that this landing site would be a valid destination for the player character 202 if the user 103 were to request enhanced motion functionality. Accordingly, as part of the game logic, the at least one processor 102 of the gaming device 101 is configured to carry out a method, an example of which is now described with reference to the flowchart in FIG. 4, which includes a plurality of steps.

Figure 4:
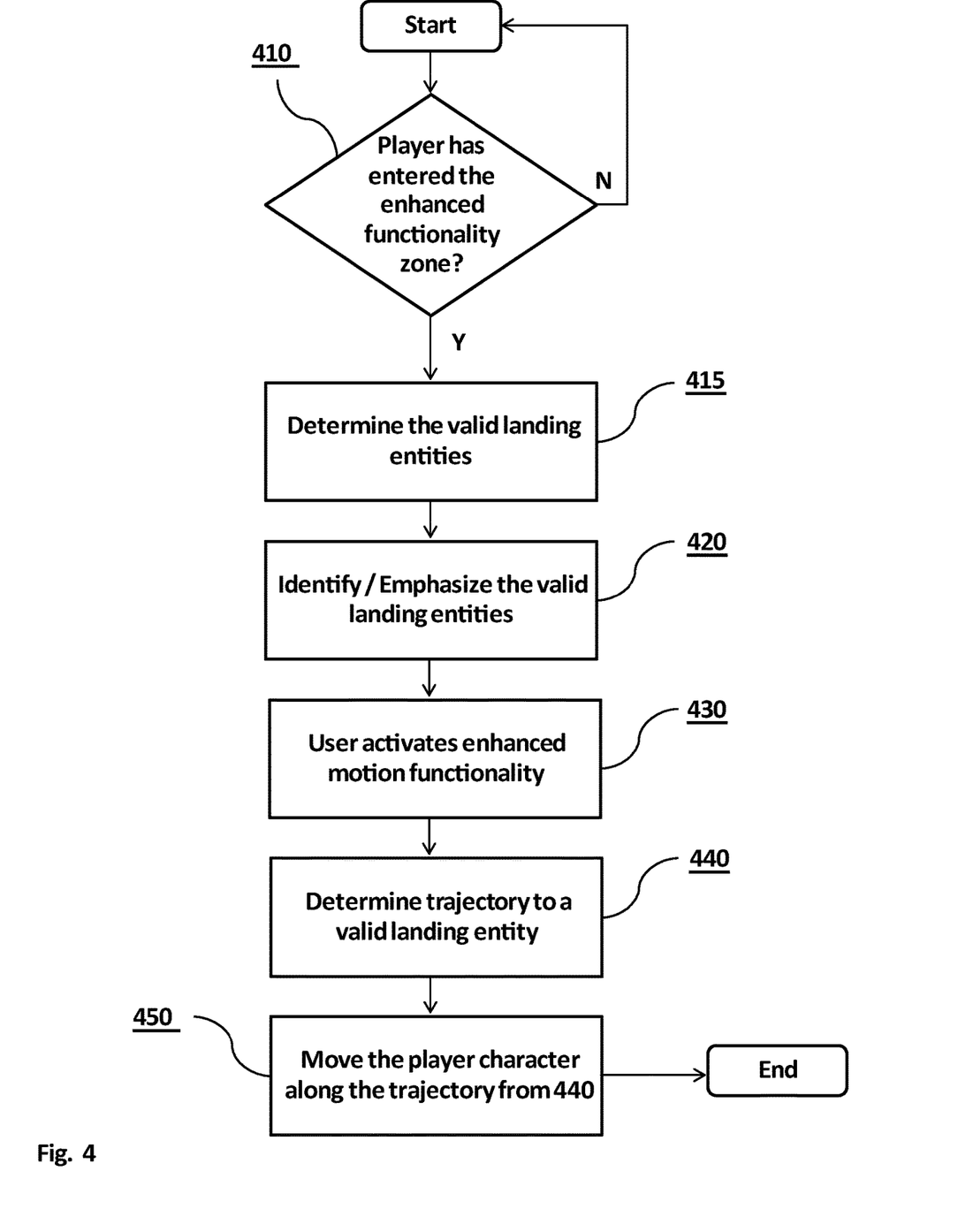
FIG. 4 is a flowchart showing steps in a method for controlling enhanced motion functionality of a player character, in accordance with a non-limiting embodiment.

Step 410:

The game logic continually attempts to identify one or more landing sites that meet validity criteria for the player character 202. In this particular example, as there are two landing sites 260, 265, the game logic would test them to determine whether either, both or none meet the validity criteria. If there is exactly one landing site that meets the validity criteria, then this landing site is selected as the "identified landing site" and the method proceeds to Step 420. If there are two or more landing sites that meet the validity criteria, then the method proceeds to Step 415. If there are no landing sites that meet the validity criteria, then the method terminates.

The validity criteria may be encoded in the memory 104. The validity criteria may be based on the current position, altitude, orientation, etc. of the player character 202 w.r.t. the positions, altitudes, etc. of the various landing sites in the 3D virtual environment.

One non-limiting example of a specific validity criterion pertaining to a particular landing site is that the particular landing site must be within the field of view of the virtual camera in the 3D virtual environment. As such, the game logic tests whether the particular landing site is within the field of view of the virtual camera and concludes that the particular landing side is valid if it is found to be within the field of view of the virtual camera.

A further non-limiting example of a specific validity criterion pertaining to a particular landing site is that the player character 202 must be facing the particular landing site. In some embodiments, this could mean that angle between the surface normal of the player character and a point on the landing site (e.g., the closest point to the player character) is within a certain number of degrees (e.g., −15 to +15 degrees, or −30 to +30 degrees, −60 to +60 degrees or even −90 to +90 degrees). In other embodiments, "facing" could mean that the particular landing site is within the field of view of the player character 202, namely, that which is "seen" by the player character's own (virtual) eyes. In such an implementation, a landing site that is positioned substantially "behind" the player character 202 in the virtual environment will not meet the validity criteria.

A further non-limiting example of a specific validity criterion pertaining to a particular landing site is a distance criterion, e.g., the distance between the particular landing site and the player character 202 has to be less than a threshold X and/or or greater than a threshold Y.

A further non-limiting example of a specific validity criterion pertaining to a particular landing site is an altitude criterion, e.g., the height between the particular landing site and the player character 202 has to be less than a threshold X and/or or greater than a threshold Y.

A further non-limiting example of a specific validity criterion pertaining to a particular landing site is "reachability", i.e., the particular landing site needs to be reachable from the current position of the player character 202. In this regard, whether a landing site is reachable may depend on the relative altitudes of the landing site and the player character 202. For example, it may be the case that the player character 202 is allowed to land on a "landing volume" type of landing site, irrespective of where the player character 202 was when enhanced motion functionality was invoked, yet the player character 202 is only able to land on a "grabbable ledge" type of landing site if coming from below (i.e., a lower altitude).

In the illustrated example, this would result in landing site 260 (which, in this case, is a landing volume) being reachable from anywhere, and landing site 265 (which, in this case, is a grabbable ledge) being reachable only if the player character 202 is somewhere on travel surface 220 when enhanced motion functionality is requested. Stated differently, if the player character 202 is on travel surface 220 when enhanced motion functionality is requested, then both landing sites 260 and 265 meet the specific validity criterion of reachability, whereas if the player character 202 is on travel surface 225 when enhanced motion functionality is requested, only landing site 260 meets the reachability validity criterion.

In some examples, the reachability of a particular landing site may be affected by the presence of a conditional validity flag and whether the flag is set.

Of course, a combination of multiple validity criteria can be used, such that only landing sites meeting all validity criteria are considered valid.

It should be appreciated that as the player's position in the virtual environment changes, so too will the identities of the landing sites that are considered valid.

Step 415:

Where two or more landing sites meet the validity criteria, each such landing site can be scored according to a number of factors, and the landing site having the best score can be referred to as the "identified landing site". Such factors may include, without being limited to, the distance (X, Y or straight-line) between the player character 202 and a point (e.g., the closest point) on the landing site (in which case a shorter distance corresponds to a better score), angle between the straight-line trajectory from the player character 202 to the landing site and the surface normal of the player character 202 (in which case a smaller angle corresponds to a better score), and so on. The surface normal of the player character 202 may be stored in the table 800 as an attribute of the player character 202. The method proceeds to Step 420.

Step 420:

The game logic can optionally identify, highlight or emphasize the identified landing site on the screen 105. Of course the identity of which landing site is the identified landing site for the player character 202 may change over time, based on the constantly changing position and orientation of the player character 202. This leads to a dynamic display whereby at any given moment, the identified landing site (i.e., the one that is highlighted or emphasized) may be different than at another given moment. Highlighting/emphasis may be provided by using a different color to illustrate the identified landing site, or to make it light up, glow or flash. Arrows may also be used to signal which landing site is the one that meets the validity criteria. This may be particularly useful as part of a tutorial to introduce new users to enhanced motion functionality. Such highlighting/emphasis may serve as a hint to the user 103 as to how the gap 210 can be crossed by the player character 202 using enhanced motion functionality.

Step 430:

The game logic receives a request for enhanced motion functionality for the player character 202. The request may be issued by the user 103. It should be appreciated that receipt of the request is independent of identifying a landing site; in other words, the request for enhanced motion functionality may be received before, during or after the execution of aforementioned steps 410-420.

Numerous variants for issuing a request for enhanced motion functionality are possible. In one example, the user 103 may issue a command for the player character 202 to jump (e.g., by pressing a button on the game controller) and then enhanced motion functionality can be requested by issuing a second command for the player character 202 to jump while the player character 202 is still in the air (e.g., by pressing the same button a second time or by pressing another button on the game controller, in rapid succession (e.g., within half a second)). In another example, the user 103 may verbalize an utterance (e.g., "Jet Boots!"), which is converted into text and interpreted to mean a request for enhanced motion functionality.

Step 440:

The game logic determines a destination point and a trajectory to the destination point. The trajectory may be an arc from the player character's current position to the destination point. Alternatively, the trajectory may be made up of straight-line portions and arc-like portions. The trajectory may traverse the gap 210.

In the case where the identified landing site is a landing volume, the destination point can be a point along the allowed axis of the landing volume which is, e.g., most central to the landing volume or closest to the player character 202.

For their part, grabbable ledges are represented in the 3D virtual environment by a specific shape, which may be defined as a box. This box is placed in the 3D virtual environment and oriented so its front is pointing away from the ledge. The lateral scale of the ledge determines the length of the ledge that can be grabbed. There may also be an association between a grabbable ledge and an adjoining section of the ground; this association may be stored in the memory 104.

As such, if the identified landing site is detected to be a grabbable ledge, several options may be possible. The method determines if the player character 202 should grab the ledge (e.g., in a "grab ledge" stance) or land on the adjoining ground behind the ledge. Specifically, a first option is for the player character 202 to land on the grabbable ledge and the other is for the player character 202 to land on the adjoining section of ground. Which option is selected may depend on factors such as the angle, the horizontal distance and the vertical distance of the player character 202 with respect to the grabbable ledge. Thus, for example, if the horizontal or vertical distance between the player character 202 and the grabbable ledge is above a certain threshold, the destination point can be somewhere along on the grabbable ledge, otherwise the destination point can be a point on the adjoining section of ground. Alternatively, it is also possible to force the player character 202 to land on the grabbable ledge (e.g., in a "grab ledge") stance, regardless of whether any of the above distance thresholds were exceeded or not.

Step 450:

The player character 202 lifts off and travels along all or part of the trajectory established at Step 440. The user 103 is given some control over navigation (e.g., left/right, as well as speed and/or acceleration) until the player character 202 approaches the destination point (e.g., landing volume or grabbable ledge or adjoining section of the ground). As such, deviations from the established trajectory are permitted, and the player character 202 might not land at the originally determined destination point, as long as the player character 202 is still headed towards a point on the grabbable ledge (or on the adjoining section of ground) or to a point on the allowable axis of the landing volume, as the case may be. As such, in this embodiment, the player character 202 prevented from migrating to a different landing site than the identified landing site, once the request for enhanced motion functionality has been made and the player character 202 is airborne.

Figure 5:
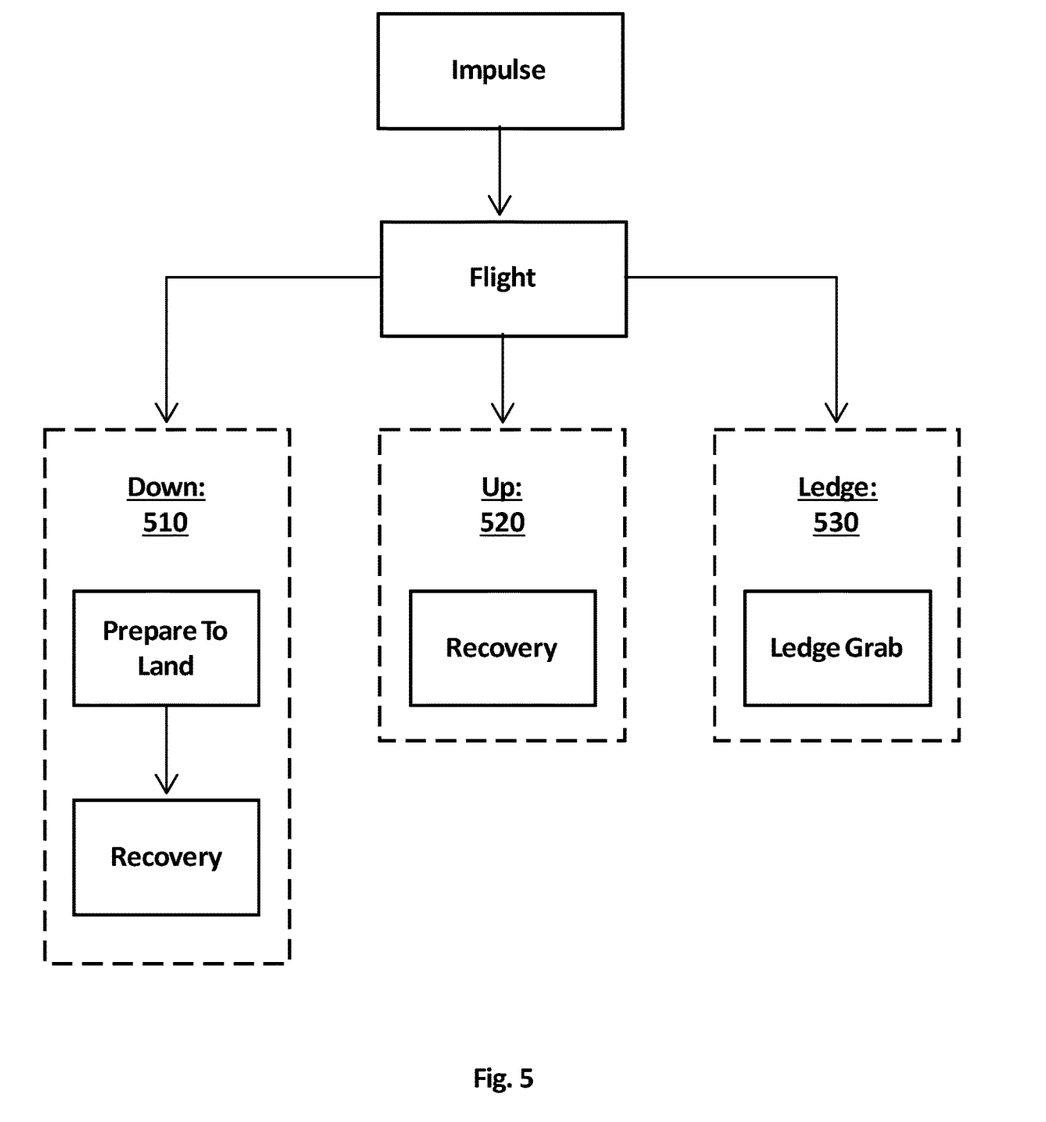
FIG. 5 is a flowchart showing possible landing animation scenarios in the method of FIG. 2, in accordance with a non-limiting embodiment.

Landing occurs at the end of the flight and is further described with reference to FIG. 5, which shows three possible landing scenarios for different use cases.

510: The identified landing site is a particular landing volume and is at a lower altitude than the player character 202 when enhanced motion functionality was requested.

In this case, a series of animations may be run by the game logic, including a "prepare to land" animation, which is triggered at a certain distance from the particular landing volume (e.g., 1.0 m or any other height, specified as a parameter in memory). During this animation, the velocity of the player character 202 will be reduced by a certain amount or ratio (which can be another parameter in memory). It is recalled that the point of landing may differ from the destination point computed at step 440, due to mid-flight navigation by the user 103. Finally, the game logic executes a "recovery" animation whereby the player character 202 gets up from a landing position and takes on a navigating stance (i.e., from crouched to a straightened posture).

520: The identified landing site is a particular landing volume and is at a higher altitude than the player character when enhanced motion functionality was requested.

In this case, there is no need for a "prepare to land" animation as there is no need to reduce the player character's velocity (design/animation request). Rather, only the "recovery" animation needs to be executed by the game logic.

530: The identified landing site is a grabbable ledge (which, in some embodiments, implies that it is at a higher altitude than the player character 202). In this case, the player character 202 may be landing on the grabbable ledge in a "grab ledge" stance, or on the adjoining ground.

In the case of landing on the grabbable ledge, a "ledge grab" animation is executed whereby the trajectory is adapted so that the hands of the player character 202 will be at the same level as the ledge. This is followed by executing a "climb" animation at the end of the trajectory, after which the player character 202 takes on a navigating stance.

In the case of landing on the adjoining ground, only the "recovery" animation needs to be executed by the game logic, similarly to step 520.

It should be appreciated that in the above embodiment, although the request for enhanced motion functionality may be issued by the user 103, actual enhanced motion functionality is prevented if Step 410 did not reveal at least one valid landing site for the current position of the player character 202. In other embodiments, in case no valid landing site is found at the time of issuing a request for enhanced motion functionality, the game logic may determine a pre-defined flight trajectory (e.g., a fixed arc to some point on the travel surface depending on the orientation of the player character 202), with the understanding that the player character 202 might only partly follow this trajectory.

It should also be appreciated that it may arise that enhanced motion functionality is requested while the player character 202 is airborne (e.g., has jumped and is falling back to a part of the travel surface that is a valid landing volume). Furthermore, it is possible that the user 103 has not oriented the player character 202 towards any other landing site (or there is no other valid landing site in the camera field of view). In that special case, if enhanced motion functionality is requested while the player character 202 is in mid-air and falling downwards, the game logic may determine a pre-defined flight trajectory (e.g., a fixed arc to some point on the travel surface depending on the orientation of the player character 202). Alternatively, requesting enhanced motion functionality while the player character 202 is in mid-air and falling downwards will give the player character 202 a boost in height (i.e., vertically) and, on its way back down to the landing volume, rather than being constrained to land along the allowed axis (which would require displacing the X-Y position of the player character 202), the player character 202 will be permitted to land back on the travel surface (and landing volume) directly below its current X-Y position. This avoids a jagged move in response to requesting enhanced motion functionality while airborne.

Figure 6:
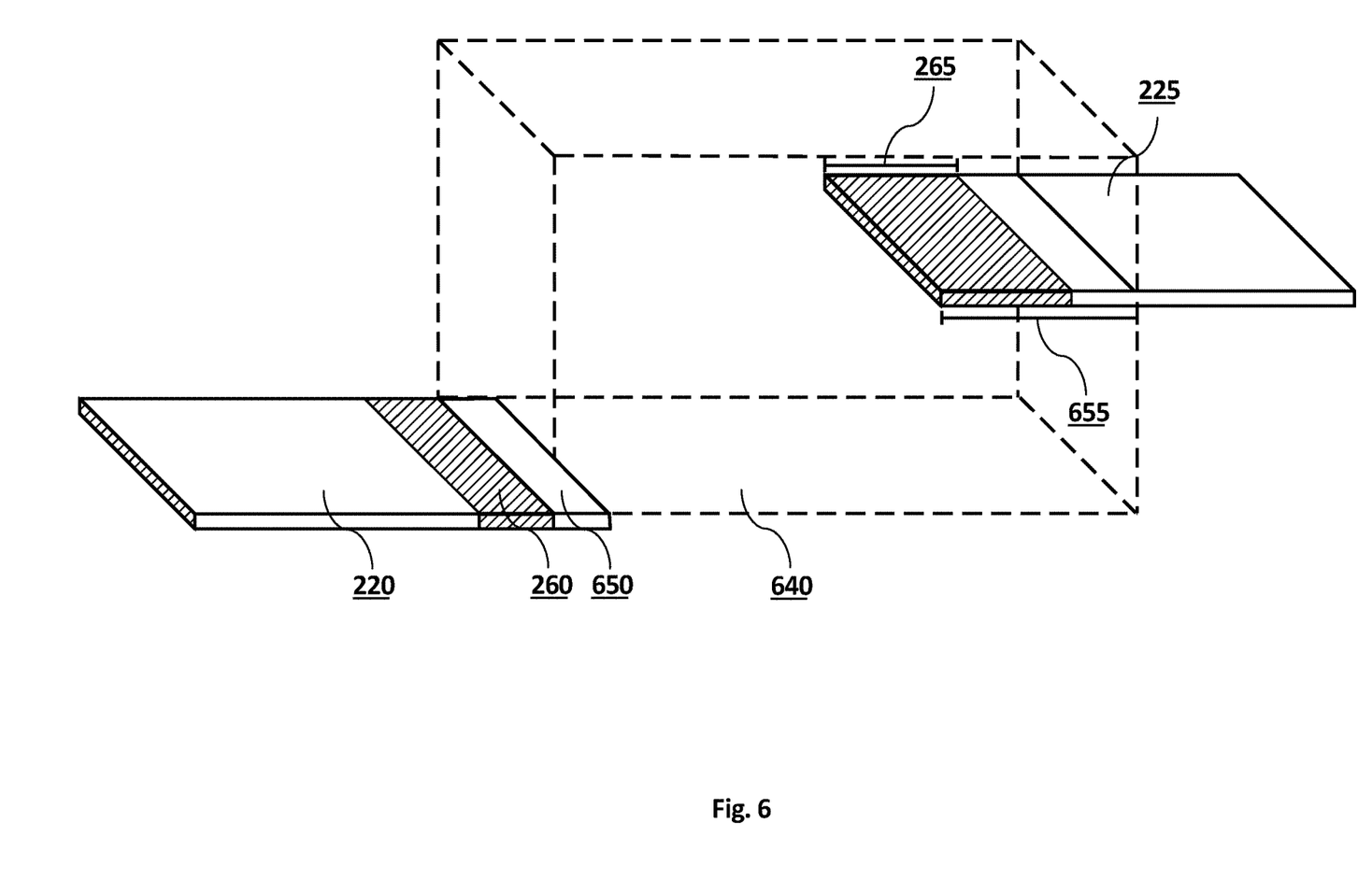
FIG. 6 depicts a scene in a video game, similar to that of FIG. 2, but showing an enhanced functionality zone around the gap, in accordance with a non-limiting embodiment.

In an alternative embodiment, and with reference to FIG. 6, the notion of an "enhanced functionality zone" (EFZ) 640 is introduced. An EFZ 640 can be viewed as a volume (e.g., a bounding box) that includes and surrounds a part 650, 655 of each travel surface 220, 225. It is further noted that the EFZ 640 may include surfaces and edges not limited to just the landing sites themselves. For example, it is noted that on the side of the gap 210 that is lower in altitude, the EFZ 640 does not extend along the travel surface 220 past the landing site 260, whereas, on the side of the gap 210 that is higher in altitude, the EFZ 640 extends along the travel surface 225 past the landing site 265. Attributes of the EFZ 640, such as the vertices that define its position, are stored in memory. For example, the EFZ 640 may be a game object for which a record is allocated in the table 800, or the EFZ 640 may be a property of a gap that is stored as a game object in the table 800 in memory 104.

In a variant of the above described process, the game logic ignores any requests for enhanced motion functionality until the player character "enters" an EFZ. The player character may enter the EFZ 640 along one of the travel surfaces 220, 225 (i.e., via parts 650, 655), or the player character may enter the EFZ 640 through the "air", e.g., by having initiated a jump from near but outside the EFZ 640.

After determining that the player character has entered the EFZ, the game logic assesses the validity of the landing sites associated with that EFZ. It is recalled that the EFZ 640 has associated with it various landing sites (these associations are stored in the memory 104 as pointers, array elements, etc.). It is also recalled that the landing sites may include "grabbable ledges" and "landing volumes". As discussed above, a further restriction on the validity of a landing site may be based on alignment, i.e., a landing site that is located behind the player character 202 will be excluded from the set of valid landing sites, even if it is in the EFZ 640.

As such, a method has been provided, in which a limited number of landing sites that can be validly reached when a player issues a request for enhanced motion functionality is determined. It may turn out that there are multiple valid landing sites that are reachable from the player character's current position. In this case, each valid landing site may be scored based on a variety of factors. In response to issuance of a request for enhanced motion functionality, the player character will travel along a path leading towards the landing site having the highest score. The trajectory of the player character's movement, as well as a destination point, can be determined in run-time based on the landing possibilities, but before travel begins.

In some embodiments, once the landing site is selected, it can no longer be changed, which may make graphical rendering of the player character more computationally efficient during travel. Nonetheless, the player retains a certain degree of maneuverability during the flight trajectory and is capable of steering the player character according to limits established by the designers of the video game.

If there are no valid landing sites available, the system computes a trajectory (in terms of horizontal and vertical distances to the player's current position) in order to acknowledge the input of the player, i.e., the player's request for enhanced motion functionality.

As a result, gameplay in which a player character has the capability of enhanced motion functionality may be made more computationally efficient, while remaining entertaining to the user. Also, the system is capable of dynamically adapting itself to the 3D virtual environment where the player character is located.

Figure 7:
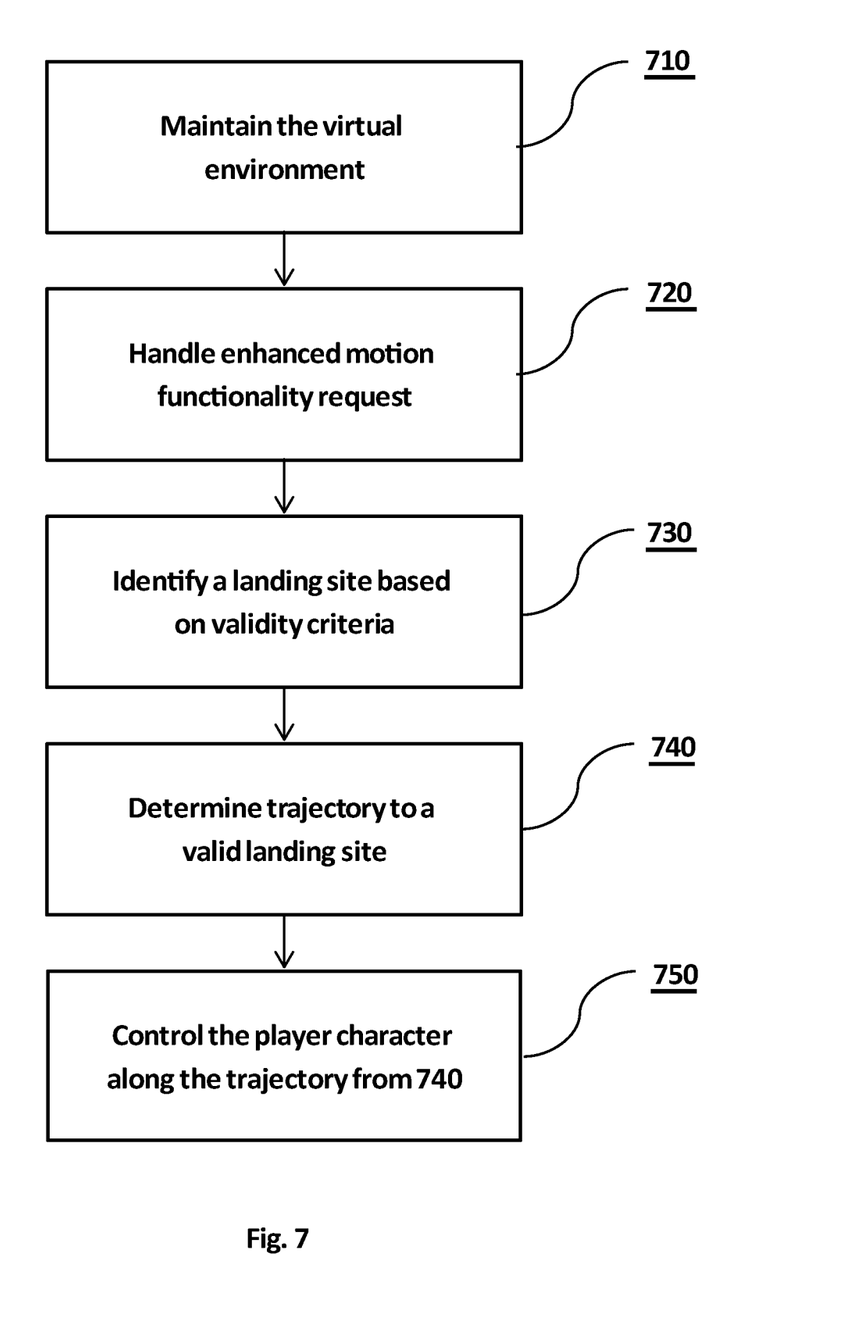
FIG. 7 is a flowchart showing multiple steps in a process for enhanced motion functionality, in accordance with a non-limiting embodiment.

With reference therefore to FIG. 7, it will be appreciated that there has been provided a method for execution by at least one processor, which comprises a step 710 of maintaining a virtual environment in the memory, the 3D virtual environment including a player character, a step 720 of receiving a request for enhanced motion functionality of the player character, a step 730 of identifying a landing site in the 3D virtual environment based on validity criteria, a step 740 of determining a trajectory to a destination point associated with the identified landing site, and a step 750 of causing the player character to exhibit enhanced motion functionality by traveling at least partly along the trajectory.

Those skilled in the art will appreciate that where a processor is described as being "configured" to carry out an action or process, this can mean that the processor carries out the action or process by virtue of executing computer-readable instructions that are read from device memory where these computer-readable instructions are stored.

It should be appreciated that while a description of certain embodiments has been provided, further variants are within the scope of the invention, which is defined by the claims appended hereto.

What is claimed is:

1. A video game apparatus, comprising:
at least one processor; and
a non-transitory storage medium operably connected to the at least one processor and storing computer-readable program instructions;
the at least one processor being configured to execute the program instructions, wherein execution of the program instructions by the at least one processor causes carrying out of a method that comprises:
maintaining a virtual environment in the non-transitory storage medium, the virtual environment including a player character;
receiving a request for enhanced motion functionality of the player character;
identifying a landing site in the virtual environment based on one or more validity criteria;
determining a trajectory to the identified landing site; and
causing the player character to exhibit enhanced motion functionality by traveling at least partly along the trajectory.

2. The video game apparatus defined in claim 1, wherein the identifying is carried out subsequent to the receiving.

3. The video game apparatus defined in claim 1, wherein the identifying is carried out prior to the receiving.

4. The video game apparatus defined in claim 1, wherein said identifying a landing site in the virtual environment based on one or more validity criteria includes testing a plurality of landing sites to identify one or more valid landing sites for the player character, wherein the identified landing site is determined from the one or more valid landing sites.

5. The video game apparatus defined in claim 4, wherein the virtual environment comprises a virtual camera, and wherein testing the plurality of landing sites comprises determining that a particular landing site is a valid landing site if it is within a field of view of the virtual camera.

6. The video game apparatus defined in claim 4, wherein testing the plurality of landing sites comprises determining that a particular landing site is a valid landing site if the player character is facing the particular landing site.

7. The video game apparatus defined in claim 4, wherein testing the plurality of landing sites comprises determining that a particular landing site is a valid landing site if the player character is within a predetermined threshold distance from the particular landing site.

8. The video game apparatus defined in claim 4, wherein testing the plurality of landing sites comprises determining that a particular landing site is a valid landing site if an altitude of the player character and an altitude of the particular landing site are to within a threshold distance of one another.

9. The video game apparatus defined in claim 4, wherein testing the plurality of landing sites comprises determining whether a particular landing site is considered reachable from a position of the player character and concluding that the particular landing site is a valid landing site if the particular landing site is considered reachable.

10. The video game apparatus defined in claim 9, wherein the particular landing site being considered reachable depends on a relative altitude of the player character and he particular landing site.

11. The video game apparatus defined in claim 10, wherein the particular landing site is one of a landing volume and a grabbable ledge, a landing volume being considered reachable by the player character from a higher or lower altitude and a grabbable ledge being considered reachable by the player character only from a lower altitude.

12. The video game apparatus defined in claim 4, wherein the one or more valid landing sites comprises a plurality of valid landing sites, and wherein the method further comprises attributing a score to each of the valid landing sites and selecting as the identified landing site one of the valid landing sites having the greatest score.

13. The video game apparatus defined in claim 12, wherein the score attributed to a landing site is based on a distance between the player character and a point on the landing site.

14. The video game apparatus defined in claim 12, wherein the score attributed to a landing site is based on an angle between a straight-line trajectory from the player character to the landing site and a surface normal of the player character.

15. The video game apparatus defined in claim 1, wherein determining is carried out subsequent to the receiving.

16. The video game apparatus defined in claim 4, wherein the method further comprising graphically emphasizing the identified landing site compared to other ones of the one or more valid landing sites.

17. The video game apparatus defined in claim 4, wherein the method comprises changing which of the one or more valid landing sites is the identified landing site as a function of a position, an orientation or both the position and the orientation of the player character.

18. The video game apparatus defined in claim 1, wherein causing the player character to exhibit enhanced motion functionality further comprises causing the player character to lift off before traveling at least partly along said trajectory.

19. The video game apparatus defined in claim 1, wherein causing the player character to exhibit enhanced motion functionality further comprises causing the player character to land on the identified landing site after traveling at least partly along said trajectory.

20. The video game apparatus defined in claim 19, wherein causing the player character to land on the identified landing site comprises executing a prepare to land animation followed by a recovery animation.

21. The video game apparatus defined in claim 20, wherein during execution of the prepare to land animation, a velocity of the player character is reduced and wherein during execution of the recovery animation, the player character gets up from a landing position and takes on a navigating stance.

22. The video game apparatus defined in claim 19, wherein causing the player character to land on the identified landing site comprises determining an allowed axis associated with the identified landing site and causing the player character to contact the identified landing site along the allowed axis.

23. The video game apparatus defined in claim 1, wherein determining a trajectory to the identified landing site comprises choosing a destination point associated with the identified landing site and determining a trajectory to the destination point.

24. The video game apparatus defined in claim 23, wherein a gap separates the player character and the identified landing site, wherein the trajectory includes a portion traversing the gap.

25. The video game apparatus defined in claim 23, wherein causing the player character to exhibit enhanced motion functionality comprises causing the player character to deviate from said trajectory further to user input and land on a second point associated with the identified landing site but different from the destination point.

26. The video game apparatus defined in claim 1, wherein the causing the player character to exhibit enhanced motion functionality comprises constraining the player character to land on the identified landing site once the request for enhanced motion functionality has been received.

27. The video game apparatus defined in claim 1, wherein causing the player character to exhibit enhanced motion functionality comprises causing the player character to exhibit gravity-defying behavior.

28. A computer-implemented video game method, comprising:

maintaining a virtual environment in a memory, the virtual environment including a player character;
receiving a request for enhanced motion functionality of the player character;
identifying a landing site in the virtual environment based on one or more validity criteria;
determining a trajectory to the identified landing site; and
causing the player character to exhibit enhanced motion functionality by traveling at least partly along said trajectory.

29. A non-transitory computer-readable storage medium storing computer-readable instructions which, when executed by a processor, cause the processor to carry out a method that comprises:

maintaining a virtual environment in the non-transitory storage medium, the virtual environment including a player character;
receiving a request for enhanced motion functionality of the player character;
identifying a landing site in the virtual environment based on one or more validity criteria;
determining a trajectory to the identified landing site; and
causing the player character to exhibit enhanced motion functionality by traveling at least partly along said trajectory.

30. A video game apparatus, comprising:

at least one processor; and
a non-transitory storage medium operably connected to the at least one processor and storing computer-readable program instructions;
the at least one processor being configured to execute the program instructions, wherein execution of the program instructions by the at least one processor causes carrying out of a method that comprises:
maintaining a virtual environment in the non-transitory storage medium, the virtual environment including a player character;
detecting that the player character has entered an enhanced functionality zone of the virtual world, the enhanced functionality zone being associated with one or more landing sites;
identifying one of the one or more landing sites in the enhanced functionality zone based on at least one of an orientation and a position of the player character; and
causing the player character to travel towards the identified landing site in response to receipt of a request for enhanced motion functionality of the player character.

* * * * *